US012759063B2

(12) United States Patent
Leung et al.

(10) Patent No.: US 12,759,063 B2
(45) Date of Patent: Oct. 13, 2026

(54) PLASTIC PIPE GROOVING TOOL AND PIPE HOLDING DEVICE FOR USE THEREWITH

(71) Applicant: IPEX TECHNOLOGIES INC.

(72) Inventors: Martin Kwan Yu Leung, Oakville (CA); Chang-Ming Huang, Waterloo (CA)

(73) Assignee: IPEX TECHNOLOGIES INC., Mississauga (CA)

( * ) Notice: Subject to any disclaimer, the term of this patent is extended or adjusted under 35 U.S.C. 154(b) by 113 days.

(21) Appl. No.: 18/883,319

(22) Filed: Sep. 12, 2024

(65) Prior Publication Data

US 2026/0070248 A1 Mar. 12, 2026

(30) Foreign Application Priority Data

Aug. 28, 2024 (CA) ................................ CA 3253978

(51) Int. Cl.
*B23D 21/00* (2006.01)
*B26D 3/06* (2006.01)

(52) U.S. Cl.
CPC ............... *B23D 21/00* (2013.01); *B26D 3/06* (2013.01)

(58) Field of Classification Search
CPC . B26D 3/06; B26D 3/16; B26D 3/161; B26D 3/22; B26D 3/166; B26D 3/169
See application file for complete search history.

(56) References Cited

U.S. PATENT DOCUMENTS

| | | | | |
|---|---|---|---|---|
| 504,786 | A | 9/1893 | Jungmann | |
| 2,798,390 | A | 7/1957 | Bennett | |
| 3,267,503 | A * | 8/1966 | Flower | B26D 3/16 15/104.012 |
| 3,283,553 | A | 11/1966 | Taylor | |
| 3,608,194 | A | 9/1971 | Miller | |
| 3,985,051 | A | 10/1976 | Brown | |
| 4,078,304 | A * | 3/1978 | Netzel | B23D 21/08 30/95 |
| 4,114,485 | A | 9/1978 | Coblitz et al. | |
| 4,166,370 | A | 9/1979 | Goodman | |

(Continued)

FOREIGN PATENT DOCUMENTS

| | | |
|---|---|---|
| CH | 36846 | 4/1906 |
| CN | 103934499 | 7/2014 |

(Continued)

*Primary Examiner* — Phong H Nguyen

(57) ABSTRACT

A pipe holding device, and a pipe grooving tool, comprising the pipe holding device, to form a circumferential groove on a longitudinal plastic pipe element. The pipe holding device has a dual curved frame extending from a first end to a second end defining an arcual opening for receiving the longitudinal pipe and a dual frame intermediate body located between the first end and the second end of the curved frame and substantially translationally moveable with respect to the arcual. A clamp releasably attaches to longitudinally extending body supports of the intermediate body at discrete positions with respect to the frame to accommodate pipes of different diameters within the arcual opening. The intermediate body further has an actuating adaptor located axially in the middle of the intermediate body for releasably attaching an actuating element for actuating a grooving element.

15 Claims, 14 Drawing Sheets

(56) References Cited

U.S. PATENT DOCUMENTS

| | | | | | |
|---|---|---|---|---|---|
| 4,268,959 | A * | 5/1981 | Taira | B23D 21/00 30/94 |
| 4,345,376 | A | 8/1982 | Benson et al. | |
| 4,402,136 | A * | 9/1983 | Rast | B23D 21/08 82/100 |
| 4,880,956 | A | 11/1989 | Mazoyer | |
| 5,528,919 | A | 6/1996 | McGrady et al. | |
| 9,586,275 | B2 * | 3/2017 | Priha | B23D 45/124 |
| 2002/0134125 | A1 | 9/2002 | Brougham | |
| 2006/0225545 | A1 | 10/2006 | Nolan et al. | |
| 2020/0130075 | A1 | 4/2020 | Chartier et al. | |
| 2022/0355386 | A1 * | 11/2022 | Wade | B23B 25/04 |

FOREIGN PATENT DOCUMENTS

| | | |
|---|---|---|
| EP | 0463274 | 1/1992 |
| EP | 1155758 | 11/2001 |
| EP | 1275447 | 1/2003 |
| EP | 2729272 | 12/2015 |
| GB | 1487033 | 9/1977 |
| KR | 102206168 | 1/2021 |

* cited by examiner 100
213
220
213
213
320
203a
212
200
211
303a
303b
213
201
300
312
311
400
313

PLASTIC PIPE GROOVING TOOL AND PIPE HOLDING DEVICE FOR USE THEREWITH

FIELD OF THE INVENTION

This invention relates to plastic pipe grooving tool to make grooves on surfaces of pipes. More specifically, the present intention relates to a pipe holding device and a plastic pipe grooving tool comprising the pipe holding device which facilitates making grooves on surfaces of pipes of different diameters.

BACKGROUND OF THE INVENTION

In the past, there have been many different types of grooving tools proposed to make grooves on pipes. Some of the prior art grooving tools have been compact and convenient, but in general could only be used for pipes of a specific diameter. Alternatively, prior art grooving tools have employed relatively complex arrangements to permit continuous adjustment to permit grooves to be made on pipes having a continuous range of diameters but could be difficult to use.

Accordingly, there is a need in the art for a convenient and compact grooving tool to make grooves on pipes of discrete different diameters representing pipe diameters most commonly used in the field. There is also a need in the art for a grooving tool which can provide a relatively quick adjustment to these discrete sizes of pipes.

Furthermore, there has been a need in the art for pipe holding devices which are versatile and may be used in the field to hold and rotate multiple lengths of pipe, having potentially different, but previously known and discrete, diameters, quickly and efficiently. Moreover, there has been a need in the art for pipe grooving tools to make grooves on multiple plastic pipes to facilitate connecting the multiple lengths of plastic pipe together in the field, such as at constructions sites or during plumbing installations, comprising these types of pipe holding devices.

SUMMARY OF THE INVENTION

Accordingly, it is an object of this invention to at least partially overcome some of the disadvantages of the prior art. Also, it is an object of this invention to provide an improved type of pipe holding device and plastic pipe grooving tool comprising such types of improved pipe holding devices.

Accordingly, in one of its aspects, this invention resides in a pipe holding device for holding longitudinally extending pipes of discrete different diameters, said pipe holding device comprising: a curved frame extending from a first end to a second end and defining a substantially arcual opening for longitudinally receiving a longitudinally extending pipe therethrough, said curved frame having a frame cradle surface facing the arcual opening and having at least one frame roller extending longitudinally for rotatably engaging a surface of a pipe longitudinally received through the arcual opening; an intermediate body having a body cradle surface facing the frame cradle surface, said intermediate body located between the first end and the second end of the curved frame and substantially translationally moveable with respect to the curved frame to move the body cradle surface with respect to the frame cradle surface, said intermediate body having at least one body roller extending substantially parallel to the frame roller for rotatably engaging the surface of the pipe longitudinally received within the arcual opening, said intermediate body further having an actuating adaptor for attaching to the intermediate body an actuating element; and a clamp for releasably attaching the intermediate body to the curved frame at predetermined translational positions thereto to accommodate, within the arcual opening, longitudinally extending pipes having discrete diameters; and wherein the clamp may releasably clamp the intermediate body to the curved frame at discrete positions so that pipes of discrete different diameters longitudinally received within the arcual opening may be held and rotated between the at least one frame roller and the at least one body roller.

In a further aspect, the present invention resides in a plastic pipe grooving tool comprising: a pipe holding device as described above and more fully described below; and an actuating element attached to the actuator adaptor for actuating a grooving element to make a groove in a plastic pipe longitudinally held by the frame rollers and the body rollers and axially rotated in the arcual opening; and wherein the clamp releasably clamps the intermediate body to the curved frame at discrete positions so that pipes of discrete different diameters longitudinally received within the arcual opening may be held and rotated between the frame roller and the at least one body roller with the grooving element engaging a surface of the longitudinally extending pipe to make a groove therein while the pipe is being rotated relative to the grooving element.

In a still further aspect, the present invention resided in a kit for a plastic pipe grooving tool comprising a pipe holding device as described above and more fully described below, and an actuating element, having a grooving element associated therewith, which is releasably attachable to the actuator adaptor of the intermediate body, said actuating element, when attached to the actuator adaptor, can actuate the grooving element to make a groove in a plastic pipe longitudinally received in the arcual opening; and wherein the clamp releasably clamps the intermediate body to the curved frame at discrete positions so that pipes of discrete different diameters longitudinally received within the arcual opening may be held and rotated between the frame roller and the at least one body roller while the grooving element engages a surface of the longitudinally extending pipe to make a groove thereon while the pipe is being rotated relative to the grooving element.

Accordingly, in one preferred embodiment, the present invention provides a pipe holding device for holding and rotating longitudinally extending pipes of discrete different diameters. The pipe holding device may have a substantially curved shaped dual frame with a substantially translationally moveable intermediate body which may be fastened to the curved shaped dual frame at discrete positions by way of a clamp so as to hold pipes of different discrete diameters therebetween. The intermediate body further preferably has an actuating adaptor facilitating attachment of an actuating element to actuate a grooving element to make the groove on the surface of the pipe. In this way, the pipe holding device may be able to hold and rotate different diameters of pipes and may also be utilized in a plastic pipe grooving tool to make grooves on plastic pipes with different diameters, with different grooving elements, and/or with different actuating elements, thereby increasing its versatility.

A further advantage of a further preferred embodiment of the pipe holding device is that the actuating adaptor could be used to attach to the intermediate body an actuating element which may comprise a powered router for electrical cutting to actuate the grooving element to make the groove on the surface of the pipe by powered cutting. This further increases the potential versatility of a pipe grooving tool comprising this preferred type of pipe holding device by permitting the same pipe holding device to be attached to different powered routers for electrically powered cutting a groove. This allows the same pipe grooving tool to be afforded by different professionals, including professional renovators and installers, as well as professionals in building construction working at commercial or multifamily installations to make different types of grooves, on different diameters of plastic pipe and with different powered routers.

A further advantage of a further preferred embodiment of the invention is that the curved shaped frame may be dual framed, meaning that, in one preferred embodiment, it is formed by first and second curved side frames that are connected together by transversely extending frame supports. Similarly, a further preferred embodiment of the invention has a dual framed intermediate body meaning that, in one preferred embodiment, the intermediate body is formed by first and second body side frames that are connected together by transversely extending body supports. In one preferred embodiment, this gives the pipe holding device axial depth along the longitudinal axis of the pipe being held therein. This may improve the stability of the pipe being held by the pipe holding device by permitting radial forces to be applied to the frame rollers and body rollers for a greater distance along the longitudinal axis. This may also improve the stability of the pipe grooving tool comprising the pipe holding device by having the actuating adaptor used to attach the actuating element, and thus the actuating element and grooving element when in use, located between the side frames of the intermediate body, and thus also axially between the side frames of the curved shaped dual frame. In this way, the actuating element may be more stably located substantially longitudinally axially in the middle of the pipe holding device and between the side frames of the curved shaped frame and the side frames of the intermediate body.

A further advantage of a further preferred embodiment of the invention is that the rollers may be formed of a resilient material, such as rubber or other similar materials, that is resiliently deformable and may have a relatively high friction coefficient. In this way, the pipe may be more stably held in the pipe holding device. Also, in this way, a pipe grooving tool comprising the pipe holding device may be able to make more consistent grooves around the surface of the circumference of a plastic pipe with less axial relative movement between the pipe and the pipe holding device while the actuating element is making the groove in on the surface of the pipe.

A further advantage of a further preferred embodiment of the invention is that the pipe holding device may be sold on its own, as part of a pipe grooving tool, or as a kit. In this way, building on the versatility of the pipe holding device, the invention further comprises a pipe grooving tool which may comprise the pipe holding device as well as a grooving element and an actuating element, as well as a pipe grooving kit which may comprise the pipe holding device, the grooving element and the actuating element. Furthermore, because the pipe holding device may be used with different types of actuating elements, the resulting pipe grooving tool or pipe grooving kit could also be sold with these different types of actuating elements, or, may be sold with one type of actuating element, such as an electrically powered router, but could be used by the user with other actuating elements.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
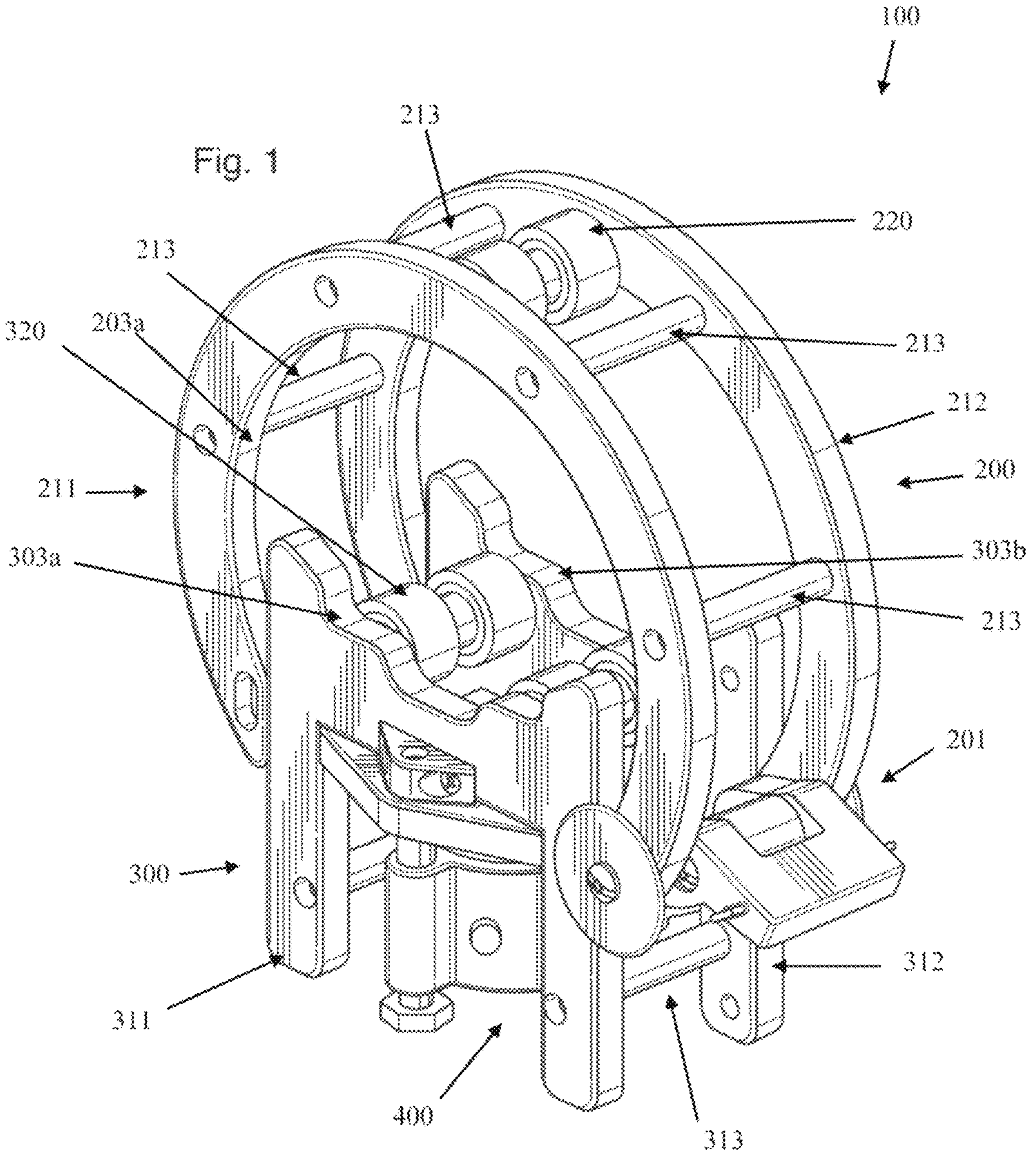
FIG. 1 illustrates a side front perspective view of a pipe holding device according to one preferred embodiment of the present invention showing the curved frame clamped to the intermediate body according to one aspect of the present invention.

In one preferred embodiment, the present invention provides a pipe holding device for holding longitudinally extending pipes of discrete different diameters with the pipe holding device having a curved frame extending from a first end to a second end defining a substantially arcual opening for longitudinally receiving the pipe, and, an intermediate body located between the first end and the second end of the curved frame and translationally moveable with respect to the curved frame. Rollers located on the curved frame and the intermediate body cooperate to hold the longitudinal pipe within the arcual opening. The rollers extend radial inwardly from cradle surfaces on the curved frame and intermediate body to contact the surface of pipes of discrete different diameters received within the arcual opening to permit the pipes to be rotated manually between the rollers and generally not contact the curved frame or the intermediate body. The rollers preferably are made of a resilient material which may have a high friction coefficient to stably hold a longitudinal pipe within the arcual opening. In a preferred embodiment, the rollers are made from rubber and extend radially into the arcual opening from the curved frame and intermediate body. The rollers rotate along roller supports to facilitate manual rotation of the pipe longitudinally received in the arcual opening. Preferably, there is one roller support on the frame and two roller supports on the body.

The intermediate body also has an actuator adapter for attaching to the intermediate body an actuating element, such as a power (electric) router. While the present invention is defined with respect to the actuating element being an electric router, it is understood that other types of actuating elements may also be used with possibly different types of grooving elements to make grooves on the surface of plastic pipes longitudinally received in the arcual opening. Preferably, the frame roller is oriented to be opposite the actuator adapter and the body rollers are oriented to be on either side of the actuator adapter to improve the stability of the pipe holding device when it is used as a plastic pipe grooving tool with an actuating element to make grooves on the pipe.

A clamp releasably attaches the intermediate body to the curved frame at predetermined positions to accommodate, within the arcual opening, longitudinally extending pipes having discrete diameters. The clamp releasably clamps the intermediate body to the curved frame at predetermined discrete positions which preferably correspond to the edges of the rollers being separated by a distance corresponding to slightly less than common diameters of pipes that would be used in the field and received in the arcual opening. In this way, the rollers may rotate about their respective roller supports while the surfaces of each of the rollers contact and rotate on the surface of the pipe longitudinally received in the arcual opening.

In a preferred embodiment, the curved frame is formed from a first curved side frame attached by longitudinally extending frame supports to a second curved side frame. The frame rollers extend longitudinally between the first curved side frame and the second curved side frame and are support by at least one frame roller support also extending longitudinally between the first and second curved side frame. Similarly, in a further preferred embodiment, the intermediate body is formed of a first body side frame attached by longitudinally extending supports to a second body side frame. The body rollers extend longitudinally between the first body side frame and the second body side frame and are supported by body roller supports also extending longitudinally between the first and second body side frames. In this embodiment, the actuating adapter is located preferably substantially in between the first body side frame and the second body side frame. The intermediate body also has opposed axially separated first and second ends. The actuator adapter is preferably located substantially axially intermediate the first end and the second end of the intermediate body. The actuator adapter is preferably located substantially between the body roller supports and diametrically opposed the frame roller supports. This is designed to improve stability of the pipe holding device when it is used as part of a pipe grooving tool to make grooves on pipes such as with an actuating element which may comprise a power (electric) actuator such as a power router connected to the actuating adapter.

Preferred embodiments of the invention and its advantages can be understood by referring to the present drawings.

In the present drawings, like numerals are used for like and corresponding parts of the accompanying drawings.

Figure 13A:
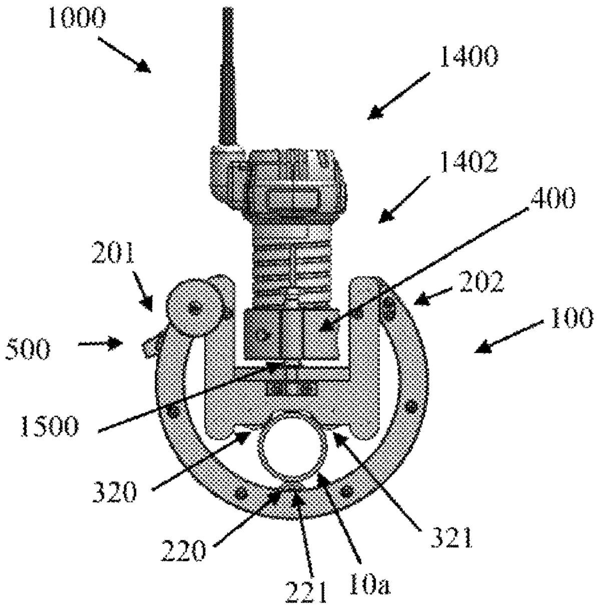
FIG. 13A shows a front view of the plastic pipe grooving tool shown in FIG. 8 having a pipe held in the pipe holding device, according to one preferred embodiment of the present invention, where the pipe has the smallest diameter that the pipe holding device can accommodate.
Figure 13B:
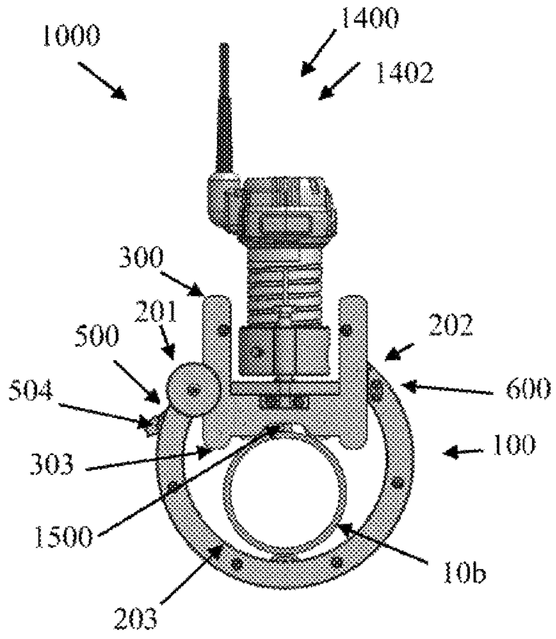
FIG. 13B shows a front view of the plastic pipe grooving tool shown in FIG. 8 having a pipe held in the pipe holding device, according to one preferred embodiment of the present invention, where the pipe has an intermediate diameter that the pipe holding device can accommodate.
Figure 13C:
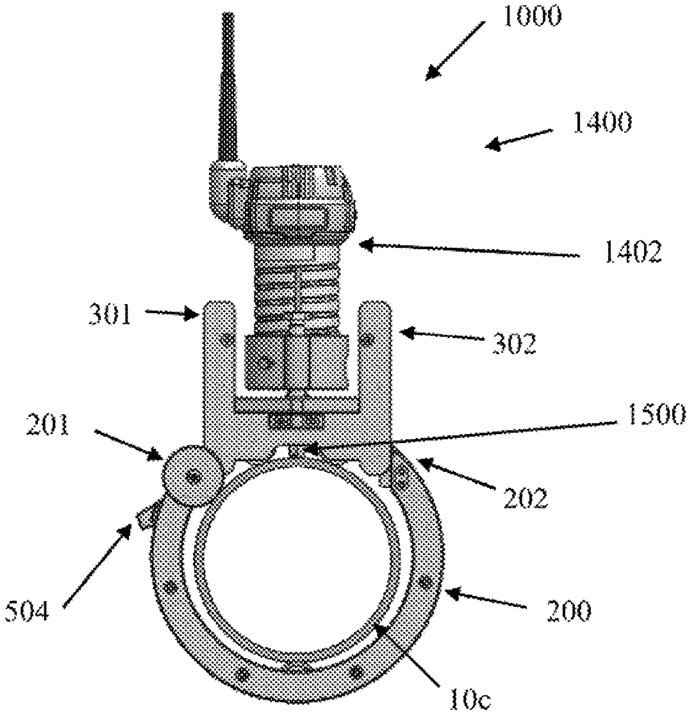
FIG. 13C shows a front view of the plastic pipe grooving tool shown in FIG. 8 having a pipe held in the pipe holding device, according to one preferred embodiment of the present invention, where the pipe has the largest diameter that the pipe holding device can accommodate.

As shown in FIGS. 1 to 7, one embodiment of the present invention relates to a pipe holding device, shown generally by reference numeral 100, for holding longitudinally extending pipes, shown generally by reference numeral 10 and specifically by reference numerals 10_a_, 10_b_ and 10_c_ to denote discrete different diameters of pipes 10 [shown for instance in FIGS. 13A, 13B and 13C]. Generally, the discrete different diameters would be the common diameter of pipes 10 for which the pipe holding device 10 would be intended to be used. By way of non-limiting example, in one embodiment, the pipe holding device 100 could be used in plumbing applications, such as to connect pipes 10 having common plumbing diameters, in which case the discrete diameters of the pipe 10 may be for smaller diameter 2 inches 10_a_, intermediate diameters 4 inches 10_b_, and largest diameter 6 inches 10_c_, but it is understood that the pipe holding device 100 could be used in other applications and with other discrete diameters of pipe 10.

In one preferred embodiment, as shown in FIG. 1, the pipe holding device 100 comprises a curved frame, shown generally by reference numeral 200, and an intermediate body shown generally by reference numeral 300. In one preferred embodiment, the curved frame 200 extends from a first end 201 to a second end 202 thereby defining a substantially arcual opening 210 between the first end 201 and the second end 202. The arcual opening 210 is oriented for longitudinally receiving a longitudinally extending pipe 10 therethrough. The curved frame 200 is sized so that the arcual opening 210 may receive a longitudinally extending pipe 10 having the maximum or largest diameter 10_c_, which in one preferred non-limiting embodiment could be 6 inches.

In one preferred embodiment, the curved frame 200 further has a frame cradle surface 203 facing the arcual opening 210 and at least one frame roller 220 extending longitudinally for rotatably engaging a surface 6 of a pipe 10 longitudinally received through the arcual opening 210 while the pipe 10 is rotated along its longitudinal axis $L_A$. Similarly, as illustrated in FIG. 1 to 7, the intermediate body 300 may also have a body cradle surface 303 substantially facing the frame cradle surface 203, and also facing the accrual opening 210. In this way, the frame cradle surface 203 and the body cradle surface 303 act to envelop or cradle the pipe 10 received in the accrual opening 202.

The intermediate body 300 is located between the first end 201 and the second end 202 of the curved frame 200. As illustrated in FIGS. 13A, B and C, and FIGS. 15A, B and C and discussed more fully below, the intermediate body 300 may move with respect to the curved frame 200. In particular, the intermediate body 300, in one preferred embodiment, is substantially translationally moveable with respect to the curved frame 200 to move the body cradle surface 303 with respect to the frame cradle surface 203. In this way, translational movement of the intermediate body 300 with respect to the curved frame 200 affects the size of the arcual opening 210 to accommodate pipes 10 of different diameters.

Similar to the frame rollers 220 of the curved frame 200, the intermediate body 300 also has at least one body roller 320 extending substantially parallel to the frame roller 220 for rotatably engaging the surface 6 of the pipe 10 longitudinally received within the arcual opening 210. The frame rollers 220 and body rollers 320 cooperate to hold the pipe 10 in the arcual opening 210 and rotate or "roll" along the surface 6 of the pipe 10 as the pipe 10 is axially rotated in the arcual opening 210. In a preferred embodiment, the rollers 220, 320, facilitate manual rotation of the pipe 10 being held by the pipe holding device 100.

In a preferred embodiment, the pipe holding device 100 may be used in a plastic pipe grooving tool, shown by reference numeral 1000 in FIGS. 8 to 15C. The pipe grooving tool 1000 comprises the pipe holding device 100 and an actuating element, shown by reference numeral 1400 in FIGS. 8 to 12. In a preferred embodiment, the actuating element 1400.

To attach the actuating element 1400 to the pipe holding device 100, the intermediate body 300 further comprises an actuating adaptor 400. The actuator adaptor 400 releasably attaches the intermediate body 300 to the actuating element 1400. When the actuating element 1400, consisting of a powered router 1402, is attached to the intermediate body 300 by the actuating adaptor 400, the grooving element 1500 may actuate the actuating element 1400 to make a groove 8 on the surface 6 of the pipe 10 longitudinally received in the arcual opening 210.

In a preferred embodiment, the pipe holding device 100 further comprises a clamp, shown generally by reference numeral 500, for releasably attaching the intermediate body 300 to the curved frame 200 at predetermined translational positions thereto [as shown for instance in FIGS. 13A, B and C]. The predetermined translational positions correspond to positions where the arcual opening 210 may accommodate longitudinally extending pipes 10_a_, 10_b_, 10_c_ having discrete different diameters as shown in FIGS. 13A, 13B and 13C. In this regard, the clamp 500 may releasably clamp the intermediate body 300 to the curved frame 200 at discrete positions so that pipes 10 of discrete different diameters longitudinally received within the arcual opening 210 may be held and rotated between the frame rollers 220 and the body rollers 330.

Figure 2:
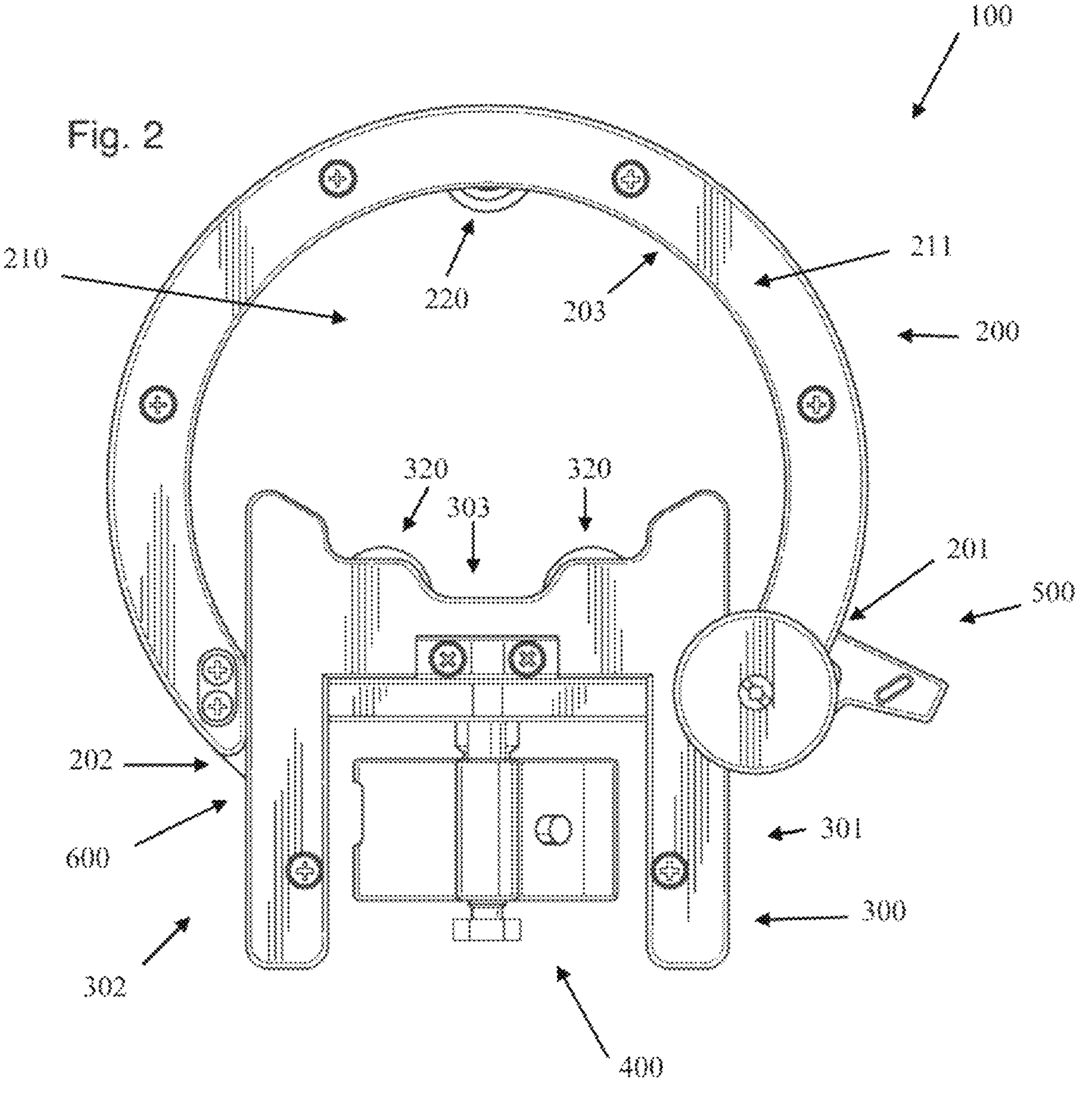
FIG. 2 illustrates a front view of the pipe holding device shown in FIG. 1.
Figure 3:
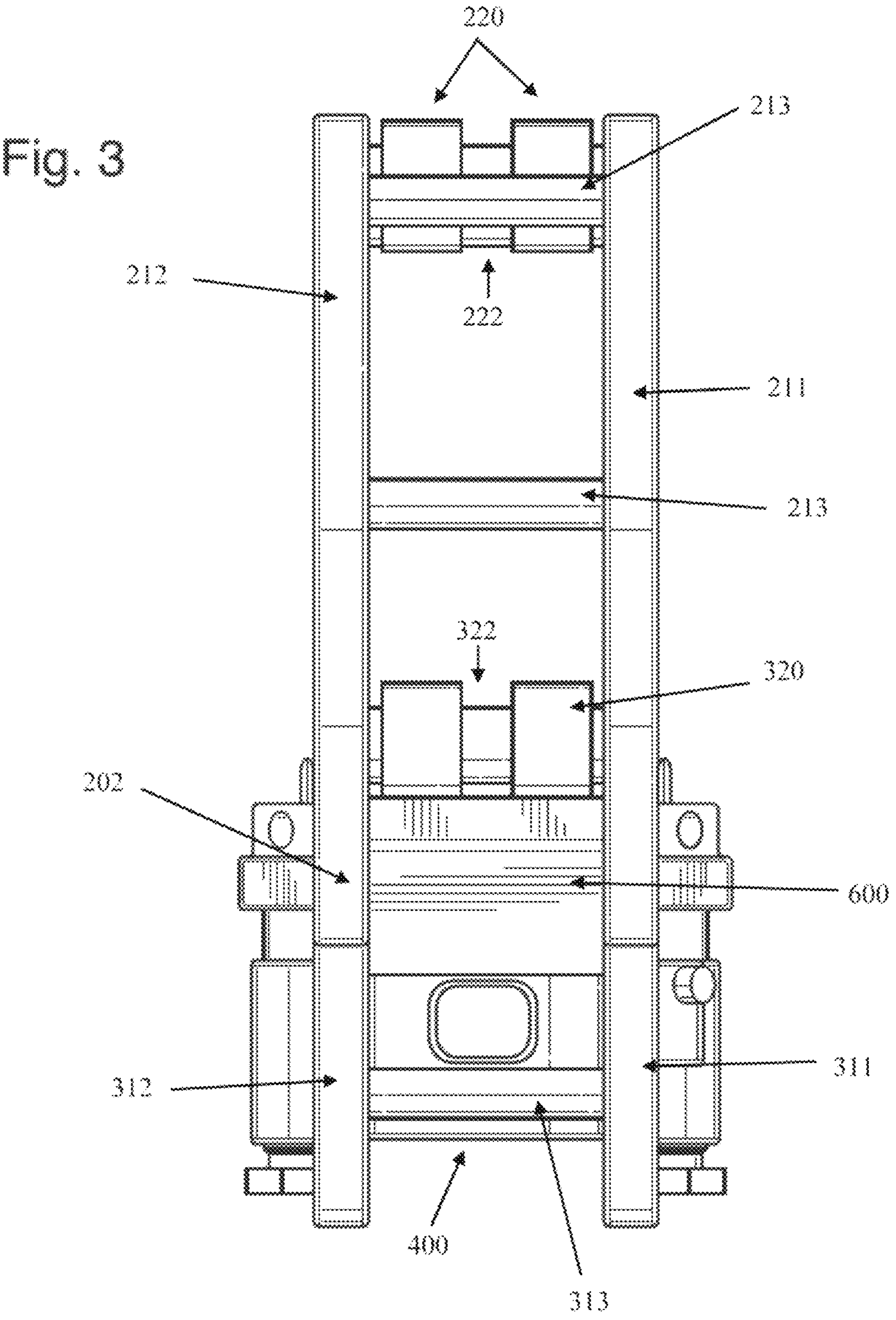
FIG. 3 is a first side view of the pipe holding device shown in FIG. 1 according to one preferred embodiment of the present invention.
Figure 4:
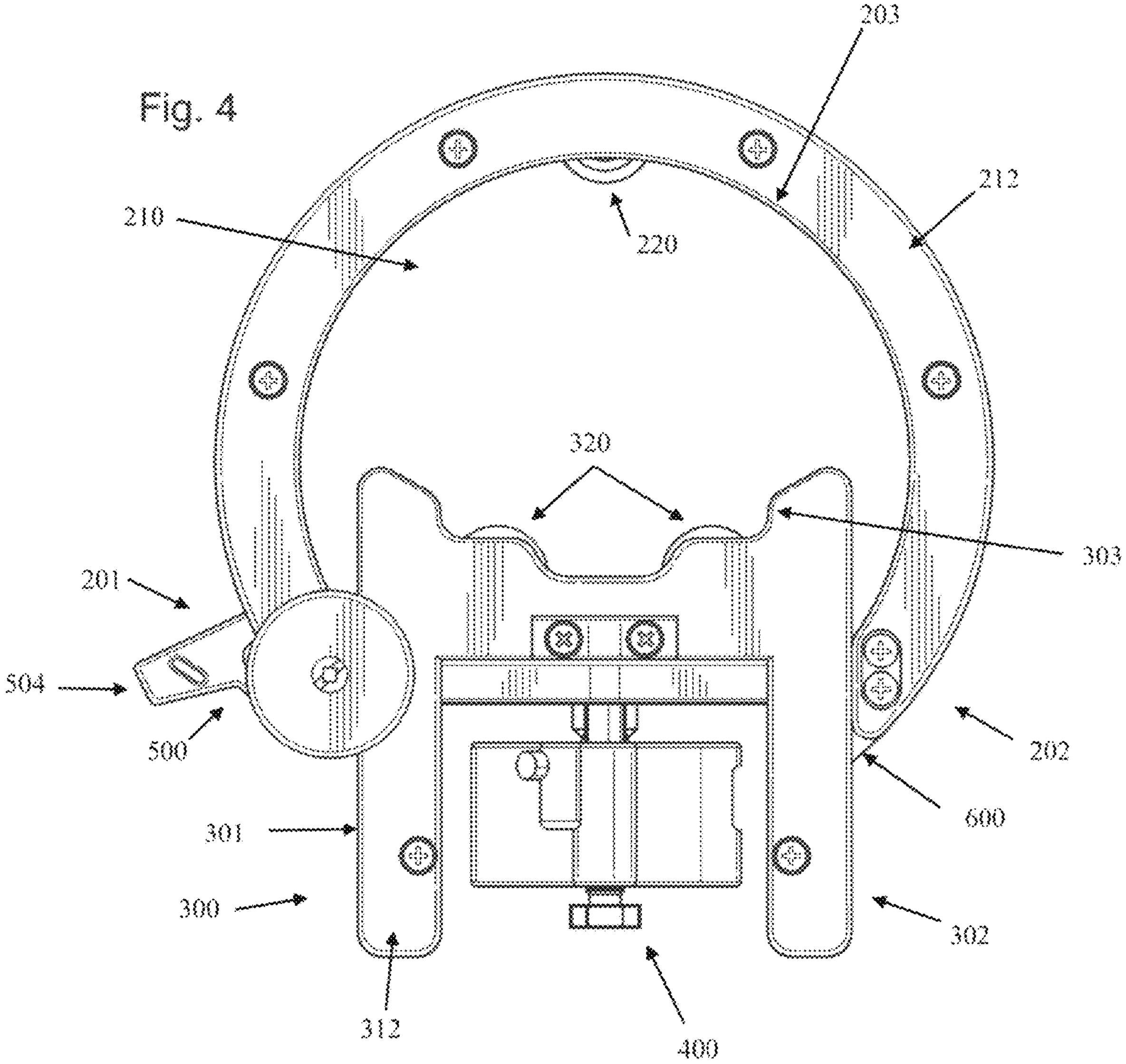
FIG. 4 is a rear view of the pipe holding device shown in FIG. 1 according to one preferred embodiment of the present invention.
Figure 5:
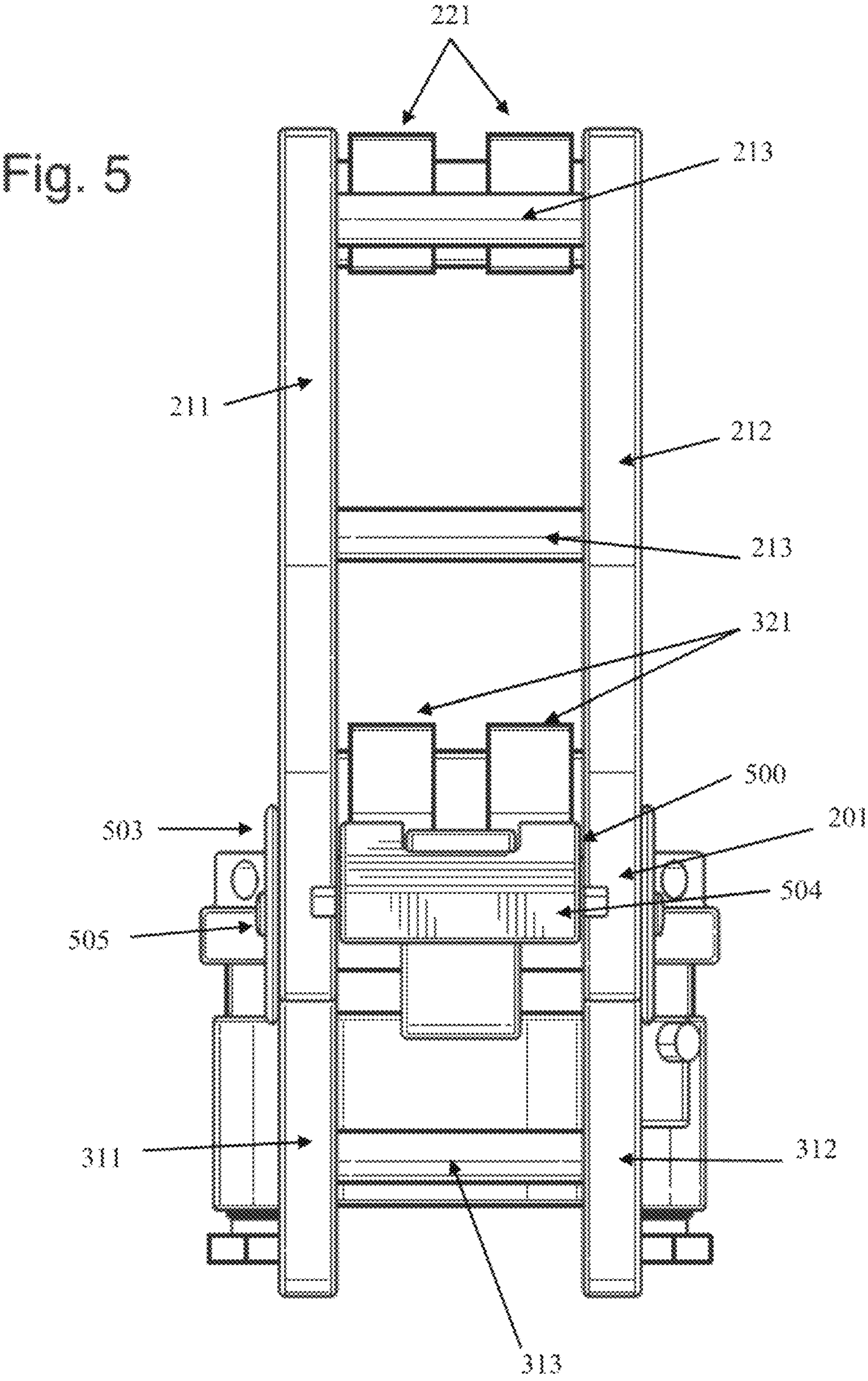
FIG. 5 is a second side view of the pipe holding device shown in FIG. 1 according to one preferred embodiment of the present invention.

In a further preferred embodiment, as shown in FIGS. 2 and 4, the at least one frame roller 220 may partially extend radially into the arcual opening 210 from the curved cradle surface 203. Similarly, the at least one body roller 320 may extend partially radially into the arcual opening 210 from the body cradle surface 303. In this way, the rollers 220, 330 may engage the surface 6 of the pipe 10 received within the arcual opening 210. More preferably, when pipes 10 of discrete different diameters are longitudinally received within the arcual opening 210, they may be held and rotated between the frame rollers 220 and the body roller 320 without contacting the curved cradle surface 203 nor the body cradle surface 303. This is illustrated, for instance, in FIGS. 13A, 13B and 13C which show the pipes 10 of different discrete diameters 10_a_, 10_b_, 10_c_, being held between the rollers 220, 230 but not contacting the curved cradle surface 203 nor the body cradle surface 303.

In a further preferred embodiment, the frame rollers 220 are made from a resiliently deformable material to permit the frame rollers 220 to frictionally hold the pipe 10 within the arcual opening 210 and between the frame cradle surface 203 and the body cradle surface 303. In a still further preferred embodiment, the body rollers 330 are also made from the same resiliently deformable material as the frame roller 220, to facilitate the body rollers 320 and the frame roller 220 frictionally, and preferably resiliently, holding the pipe 10 within the arcual opening 210 and preferably between the frame cradle surface 203 and the body cradle surface 303. In this way, while the pipe 10 is being held, and possibly axially rotated, such as to make the groove 8 when the pipe holding device 100 is used in the tool 1000, the pipe 10 will not contact, or will only minimally contact, the curved cradle surface 203 and the body cradle surface 303.

In a further preferred embodiment, in addition to the frame rollers 220 and body rollers 330 being made from a resiliently deformable material to frictionally hold the pipe 10 between the frame cradle surface 203 and the body cradle surface 303, the body rollers 320 rotate about body roller supports 322 and the frame rollers 220 rotate about frame roller supports 222. This further facilitates manual rotation of the pipe 10 by hand while the pipe 10 is frictionally held by the frame rollers 220 and the body rollers 320 between the frame cradle surface 203 and the body cradle surface 303, such as while grooving element 1500 is actuated by the actuating element 1400 to make the groove 8.

In a further preferred embodiment, the resiliently deformable material is selected from the group of rubber and rubberized polymers. In addition, it is preferable that the frame and body rollers 220, 320 will have a thickness of resilient material, such as rubber or rubberized polymers, sufficient to permit some resilient deformation (which may also create inwardly radial holding forces, and possibly increase surface frictional forces) while the pipe 10 is held by the frame and body rollers 220, 320, but not resiliently radially deform to the extent that the pipe 10 may contact the frame cradle surface 203 or the body cradle surface 303. This is illustrated for instance in FIGS. 13A, 13B, and 13C which shows the pipes 10*a*, 10*b*, and 10*c* being held between the resiliently deformed frame and body rollers 220, 320, but still maintaining a radial distance separating the surface 6 of the pipe 10 from the frame cradle surface 203 and the body cradle surface 303.

In a further preferred embodiment, as illustrated in all the Figures, but shown best in FIGS. 1, 3, 5, 8 10, 11 and 12, the intermediate body 300 has a dual frame meaning that it has a first body side frame 311 and a substantially similar second body side frame 312. The body side frames 311, 312 are connected to each other by longitudinally extending body supports, shown generally by reference numeral 313. The longitudinally extending body supports 313 perform several functions including longitudinally separating the first body side frame 311 from the second body side frame 312. This gives the intermediate body 300 axial depth. Furthermore, the first body side frame 311 has a first body side cradle surface 303 a [shown best in FIG. 1] and the second body side frame 312 has a second body side cradle surface 303*b*. The first and second body side cradle surfaces 303*a*, 303*b* face the arcual opening 210 and form the body cradle surface 303 facing the frame cradle surface 203. As shown in the Figures, such as FIGS. 1 to 6, the intermediate body 300 formed by body side frames 311, 312 connected to each other by longitudinally extending body supports 313, also permits the body rollers 320 to be arranged between the body side frames 311, 312 so that it is easier to have a portion of the rollers 320 extend radially inwardly from the body cradle surface 303 to contact the surface 6 of the pipe 10.

Figure 14A:
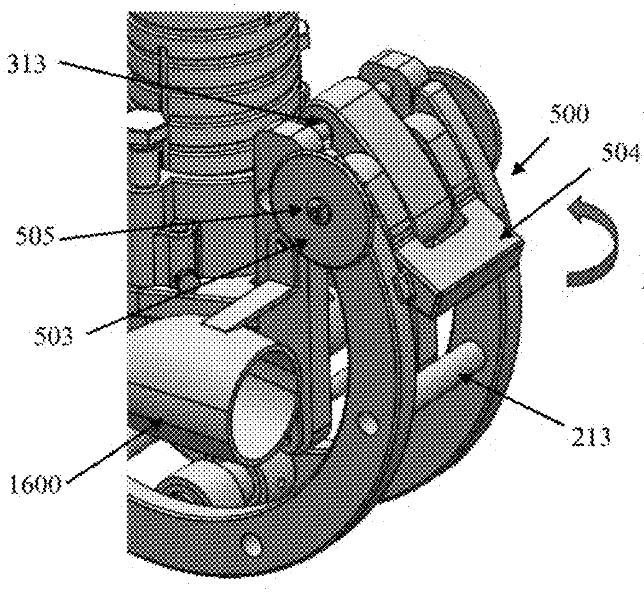
FIG. 14A shows an enlarged view of the clamp of the pipe holding device in a closed position with an arrow identifying how to move the lever to the open position to release the clamp hook from the longitudinally extending body support.
Figure 14B:
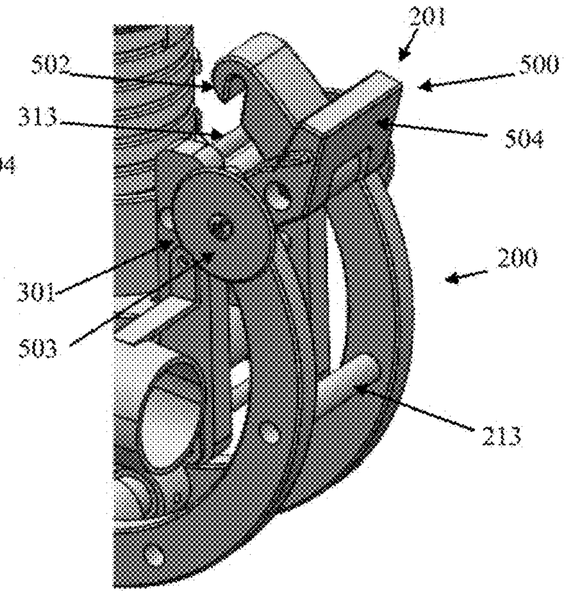
FIG. 14B shows an enlarged view of the clamp of the pipe holding device in an open position releasing the longitudinally extending body support from the clamp hook.
Figure 15A:
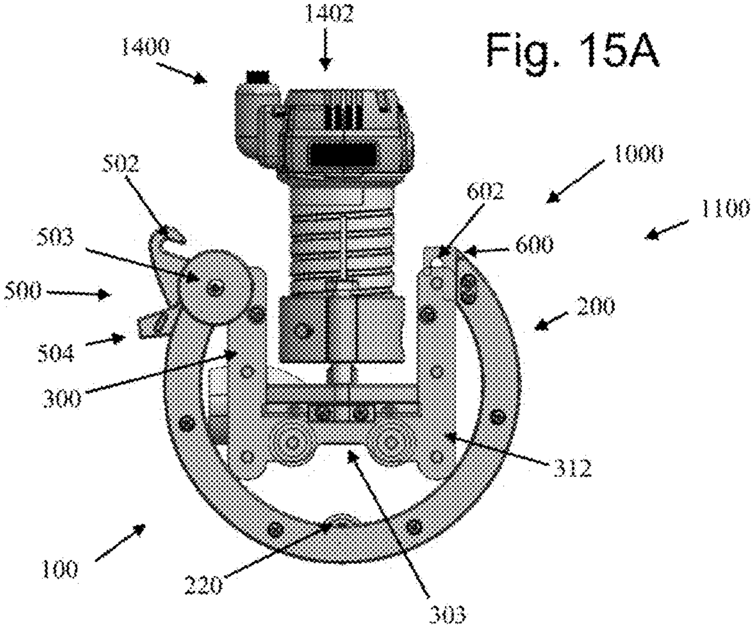
FIG. 15A shows a front view of the plastic pipe grooving tool, and a plastic pipe grooving tool kit, with the clamp in the open position and the clamp hook disengaged from one of the pair of longitudinally extending body supports furthest from the body cradle surface, and, the retainer member hook being disengaged from the corresponding longitudinally extending body supports furthest from the body cradle surface, which pair of longitudinally extending body supports furthest from the body cradle surface accommodate the smallest diameter pipe in the arcual opening, and with the pairs of longitudinally extending body supports and the retaining member hook shown through the second body side frame for ease of illustration.
Figure 15B:
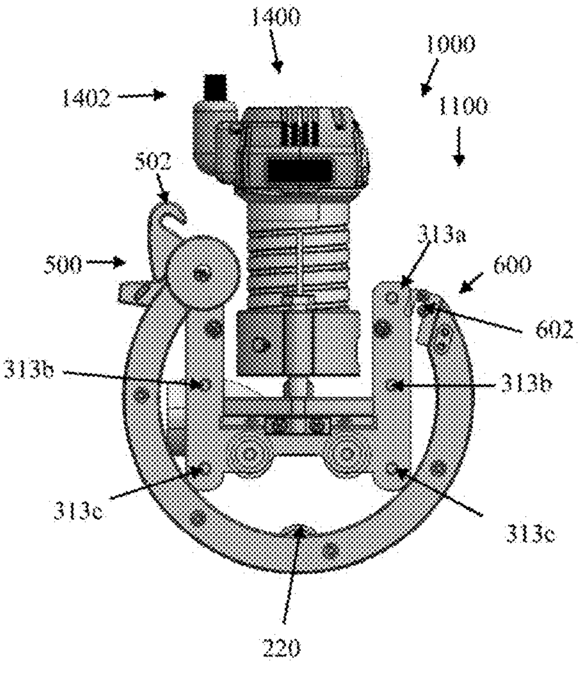
FIG. 15B shows a front view of the plastic pipe grooving tool, and a plastic pipe grooving tool kit, with the clamp in the open position and the clamp hook and retaining member hook disengaged from the pair of longitudinally extending body supports furthest from the body cradle surface to permit relative translational movement of the intermediate body with respect to the curved frame, and with the pairs of longitudinally extending body supports and the retaining member hook shown through the second body side frame for ease of illustration.
Figure 15C:
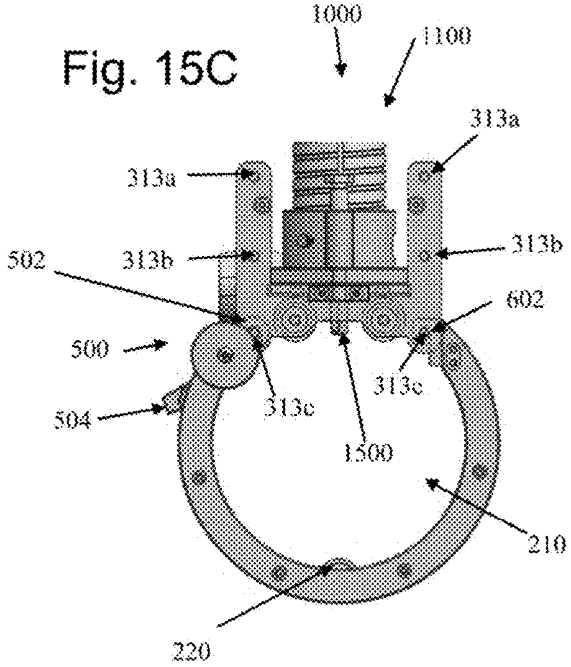
FIG. 15C shows a front view of the plastic pipe grooving tool with the clamp lever in the closed position and with the retaining member hook and clamp hook engaging the pair of equally distant longitudinally extending body supports closest to the body cradle surface to accommodate a pipe in the arcual opening having the largest diameter, and with the pairs of longitudinally extending body supports as well as the clamp hook and the retaining member hook shown through the second body side frame for ease of illustration.

In a further preferred embodiment, in addition to connecting and longitudinally separating the first and second body side frames 311, 312, the longitudinally extending supports 313 also function to assist in clamping the curved body 200 to the intermediate body 300. In particular, the clamp 500 engages at least one of the longitudinally extending body supports 313 to releasably attach the intermediate body 300 to the curved frame 200 at discrete positions thereto to accommodate longitudinally extending pipes 10 having discrete diameters within the arcual opening 210 and between the frame rollers 220 and the body roller 320. This is illustrated for instance in FIGS. 14A and 14B which show the clamp hook 502 engaging and disengaging one of the longitudinally extending supports 313. This is also illustrated in FIGS. 15A, 15B and 15C which show the second body side frame 312 as partially transparent for ease of illustration to show the longitudinally extending supports 313 as well as the clamp hook 502 and retainer hook 602 in FIG. 15C engaging the pair 313*c* of longitudinally extending supports 313 as discussed more fully below.

In a further preferred embodiment, the intermediate body 300 has a first side 301 and a second side 302 transversely opposite from the first side 301, as shown for instance in FIGS. 2 and 4. The first end 201 of the curved frame 200 is received on the first side 301 of the intermediate body 300 between the first body side frame 311 and the second body side frame 312, and, the second end 202 of the curved frame 200 is received on the second side 302 of the intermediate body 300 between the first body side frame 311 and the second body side frame 312 to facilitate the substantially translational relative movement of the intermediate body 300 with respect to the curved frame 200. This is also shown, for instance, in FIGS. 13C and 15C. In this preferred embodiment, the body rollers 320 are located between the first body side frame 311 and the second body side frame 312 on roller supports, shown generally be reference numeral 322 and shown best in FIGS. 5 and 6, which roller supports 322 extend substantially parallel to the longitudinally extending body supports 313 but are arranged closer to the body cradle surface 303 so that a portion of the rollers 320 extend radially into the arcual opening 210 as discuss more fully above.

Furthermore, in the preferred embodiment where the intermediate body 300 has a first body side frame 311 connected to a substantially similar second body side frame 312 by longitudinally extending body supports 313 longitudinally separating the first body side frame 311 from the second body side frame 312, it is preferred to have the actuating adaptor 400 located between the first body frame 311 and the second body frame 312, as shown for instance in FIGS. 1, 2, 4, 7, 8, 9, 10 and 12. Furthermore, in this preferred embodiment, the actuating adaptor 400 is located substantially axially intermediate the first end 301 and the second end 302 of the intermediate body 300, shown for instance at least in FIG. 2. In this way the actuating adaptor 400 is preferably located substantially in the middle, transversely and longitudinally, of the intermediate body 300. This improves the durability and stability of the intermediate body 300 and pipe holding device 100 when an actuating element 1400, such as a power router 1402, is attached to the intermediate body 300 by attaching to the actuating adaptor 400. The actuating adaptor 400 may have a grooving opening, shown generally by reference numeral 430 in FIG. 7, though which the grooving element 1500 may pass to engage the surface 6 of the pipe 10.

In a further preferred embodiment, the curved frame 200 also has a dual frame in that in this embodiment the curved frame 200 comprises a first curved side frame 211 and a second curved side frame 212, with the first curved side frame 211 connected to the second curved side frame 212 by longitudinally extending frame supports, shown generally by reference numerals 213, longitudinally separating the first curved side frame 211 from the second curved side frame 212. In this embodiment, the first curved side frame 211 has a first curved side frame cradle surface 203*a* [shown best in FIG. 1], and the second curved side frame 212 has a second curved side frame cradle surface 203*b*. The first and second curved side frame cradle surfaces 203*a*, 203*b* face the arcual opening 210 and together form the frame cradle surface 203 facing the body cradle surface 303. Furthermore, in this embodiment, the frame rollers 220 are located between the first curved side frame 211 and the second curved side frame 212 on roller supports 222 substantially parallel to the longitudinally extending frame supports 213, as shown for instance in FIGS. 6 and 12.

As illustrated for instance in FIGS. 1 to 7, in this preferred embodiment, the first curved side frame 211 is located near the first body side frame 311 and the second curved side frame 222 is located near the second body side frame 312, with the longitudinally extending frame supports 213 substantially parallel to the longitudinally extending body supports 313. In this way, the pipe holding device 100 extends, or has a depth, longitudinally parallel to the longitudinal axis $L_A$ of the pipe 10 to support the rollers 220, 320 and the actuating element 1400 attached to the actuator adaptor 400.

In a further preferred embodiment, the at least one body roller 320 comprises two longitudinally separated body rollers 321 located on the corresponding body roller supports 322 situated between the first body side frame 311 and the second body side frame 312 and substantially parallel to the longitudinally extending frame supports 313. Similarly, the at least one frame roller 220 comprises two longitudinally separated frame ollers 220 on a single frame roller support 222. In other words, preferably, the single frame roller support 222 has two longitudinally separated frame rollers 221 and each of the two body roller supports 322 have two longitudinally separated body rollers 321. In this embodiment, the actuator adaptor 400 is located between the two body rollers supports 322 and diametrically opposed from the frame roller support 222. This preferred arrangement of the rollers 220, 320 is shown throughout the drawings, including in FIG. 5. With this preferred arrangement, the actuating adaptor 400 is located opposed from the frame rollers 220 so that the frame rollers 220 may absorb forces created by the grooving element 1500 contacting the pipe 10 to make the groove 8. Also, with this preferred arrangement, the body rollers 320 may better stabilize and hold the pipe 10 on either side of the grooving element 1500 while it is making the groove 8 on the pipe 10.

As discussed above, in one preferred embodiment, the present invention also relates to a plastic pipe grooving tool, shown generally by reference numeral 1000. As shown in FIGS. 8 to 12, the pipe grooving tool 1000 comprises the pipe holding device 100 and an actuating element 1400 attached to the actuator adaptor 400. The actuating element 1400 is operable to actuate a grooving element 1500 to make a groove 8 in a plastic pipe 10 held by the frame rollers 220 and the body rollers 320 and axially rotated in the arcual opening 210. It is understood that the actuating element 1400 may be any element that can actuate a grooving element 1500, such as a bit or other cutting or grooving mechanism, such as a rotary cutter which can make a groove 8 in a plastic pipe 10, collectively referred to as a grooving element 1500.

In this preferred embodiment, the plastic pipe grooving tool 1000 has an actuating element 1400 which comprises a power (electric) router, shown generally by reference numeral 1402. The power router 1402 shown in FIGS. 8 to 12 is a DeWalt [trademark] router but it is understood that different types of power routers 1402 may be attached to the actuating adaptor 400. The powered router 1402 may electrically operate the grooving element 1500 to make the groove 8 in the plastic pipe 10. Furthermore, as illustrated at least in FIGS. 8 to 12, the powered router 1402 is preferably located longitudinally axially intermediate the first side 301 of the intermediate body 300 and the second side 302 of the intermediate body 300 when the powered router 1402 is attached to the actuator adaptor 400.

The pipe grooving tool 1000, as shown in FIGS. 8 to 12, has a pipe 10 held within the pipe holding device 100. The clamp 500 releasably clamps the intermediate body 300 to the curved frame 200 at discrete positions so that pipes 10 of discrete different diameters longitudinally received within the arcual opening 210 may be held and rotated between the frame rollers 220 and the body rollers 320, with the grooving element 1500 engaging a surface 8 of the longitudinally extending pipe 10 to make a groove 8 therein while the pipe 10 is being rotated relative to the grooving element 1500. In a further preferred embodiment, actuating the lever 504 of the clamp provides a quick release of the clamp 500 from the longitudinal extending body supports 313 of the intermediate body 300 permitting translational movement of the intermediate body 300 with respect to the curved body 200 to separate the frame rollers 220 from the body rollers 320 to release the plastic pipe 10 from the pipe grooving tool 1000.

The clamp 500, according to one preferred embodiment is located between the first curved side frame 211 and the second curved side frame 212 at the first end of curved frame 201, and a retaining member 600 is located between the first curved side frame 211 and the second curved side frame 212 at the second end 202 of the curved frame 200, as illustrated for instance in FIGS. 3, 4, 5, 6 and 7. Furthermore, the clamp 500 has a clamp hook 502 and the retaining member 600 has a retaining member hook 602 according to one preferred embodiment, and as illustrated for instance at least in FIGS. 14A to 15C.

In addition, the longitudinally extending body supports 313 are oriented along the first side 301 and the second side 302 of the intermediate body 300 in pairs 313*a*, 313*b* and 313*c*, as shown for instance in FIGS. 15A, 15B and 15C, with the side body side frame 312 shown as partially transparent for ease of illustrating the pairs 313*a*, 313*b* and 313*c*, as well as the clamp hook 502 and retaining member hook 602 engaging the different pairs 313*a*, 313*b* and 313*c*. Each pair 313*a*, 313*b* and 313*c* of longitudinally extending body supports 313 are substantially equidistant from the body cradle surface 303 of the intermediate body 300 as shown in FIGS. 15A, 15B, and 15C, with one of each pair 313*a*, 313*b* and 313*c* of equidistant longitudinally extending body supports 313 being arranged on the first side 301 of the intermediate body 300 and a corresponding other one of the pair 313*a*, 313*b* and 313*c* of equidistant longitudinally extending body supports 313 being arranged on the second side 302 of the intermediate body 300. As illustrated in FIGS. 14A and 14B, the clamp 500 has a clamp lever 504 to move the clamp hook 502 from an engaged or closed position [see FIG. 14A], where the clamp hook 502 engages one of the longitudinally extending body supports 313 on the first side 301 of the intermediate body 300 when the retaining member hook 602 engages the corresponding equidistant longitudinally extending body support 313 on the second side 302 of the intermediate body 300, to a disengaged or open position [14B], where the transversely extending body support 313 on the first side 301 of the intermediate body 300 is released from the clamp hook 502 permitting the retaining member hook 602 [see FIG. 14C] to be disengaged from the corresponding equidistant transversely extending body support 313 on the second side 302 of the intermediate body 300 thereby permitting relative translational movement of the intermediate body 300 with respect to the curved frame 200. The arrow in FIG. 14A illustrates the movement required to move the clamp lever 504 from the engaged or closed position [see FIG. 14A] to the disengaged or open position [see FIG. 14B].

Figure 6:
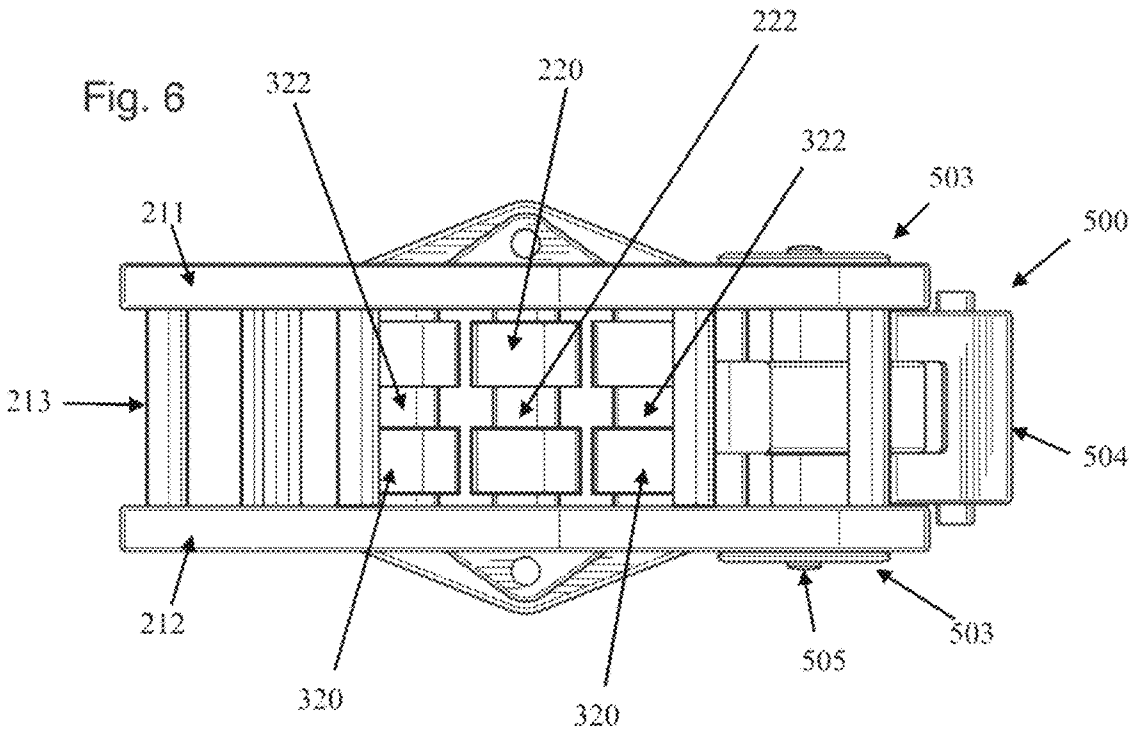
FIG. 6 is a top view of the pipe holding device shown in FIG. 1 according to one preferred embodiment of the present invention.
Figure 7:
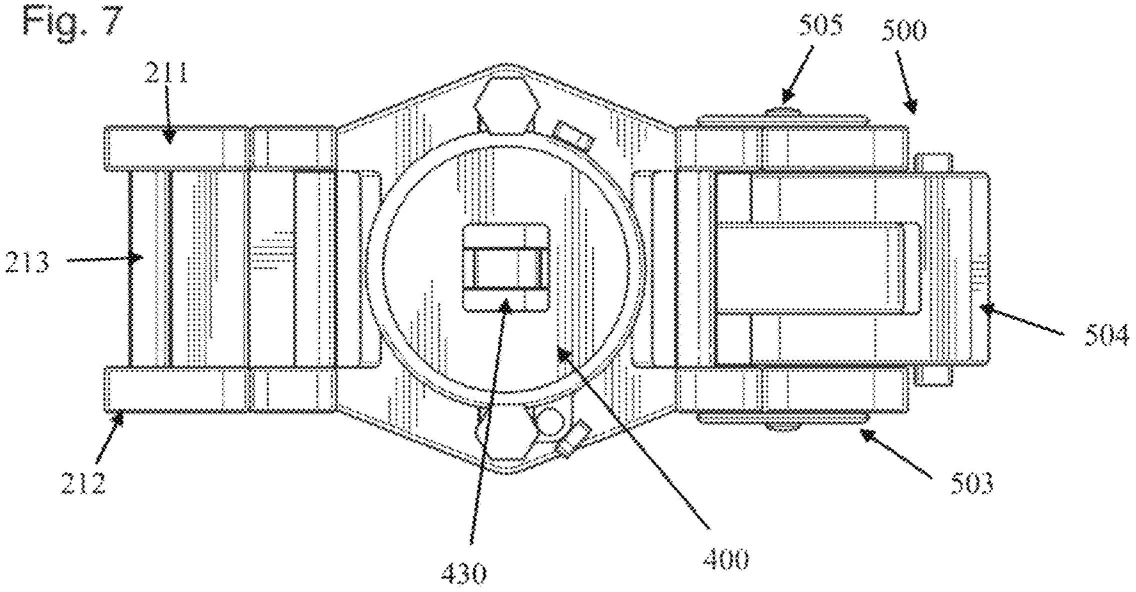
FIG. 7 is a bottom view of the pipe holding device shown in FIG. 1 according to one preferred embodiment of the present invention.
Figure 8:
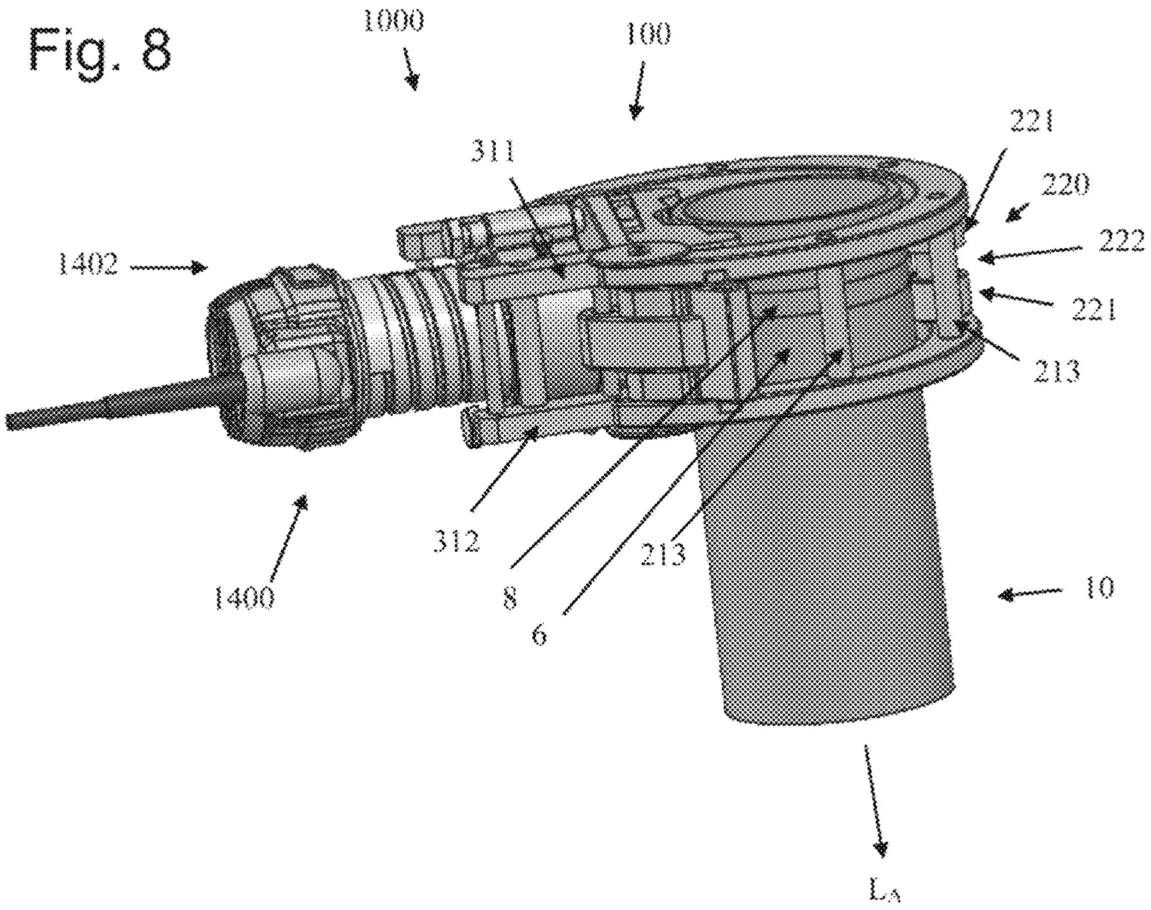
FIG. 8 is a perspective view of a plastic pipe grooving tool comprising the pipe holding device shown in FIG. 1 with the pipe holding device having a pipe held therein and a powered (electric) router attached to the actuator adapter of the intermediate body.
Figure 9:
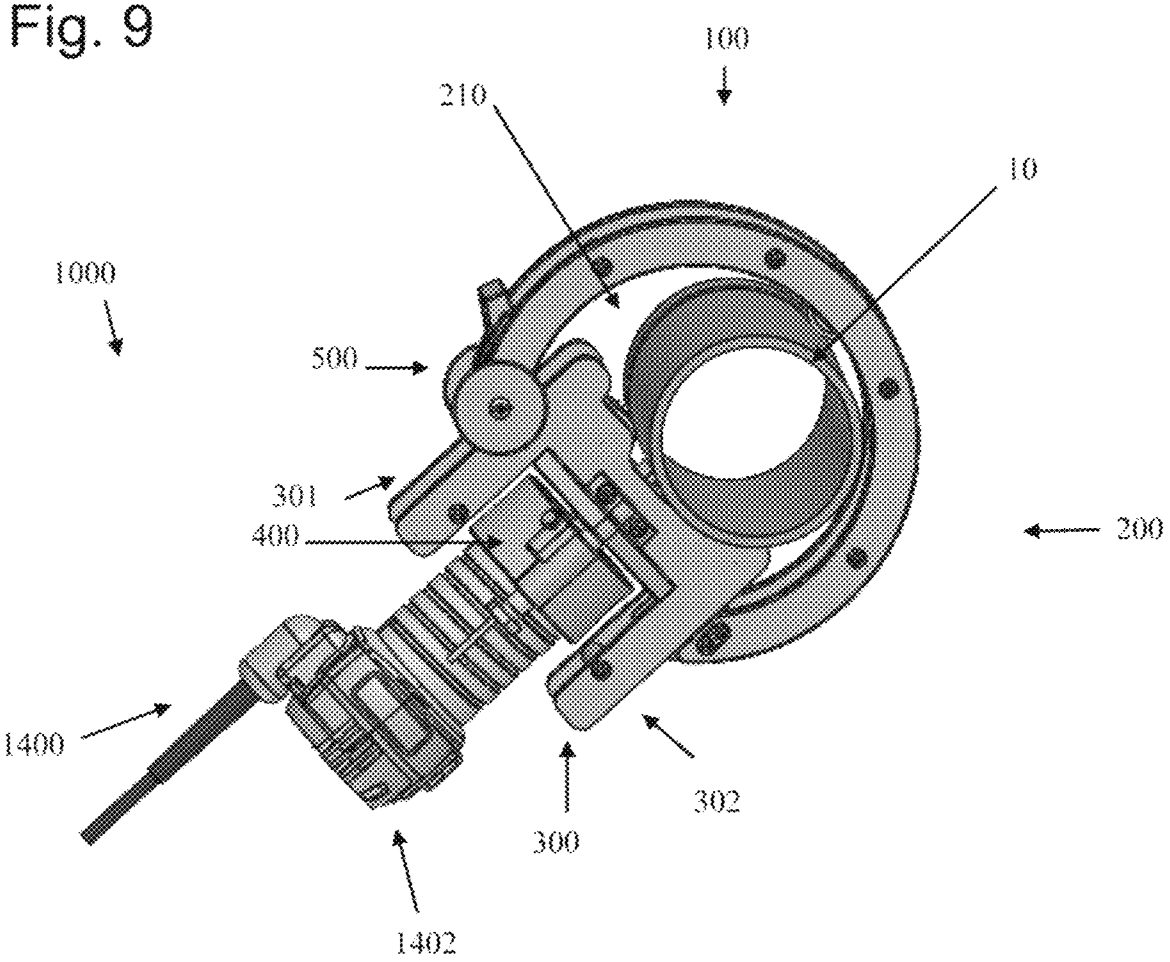
FIG. 9 is a further perspective view of the plastic pipe grooving tool shown in FIG. 8 having a pipe held in the pipe holding device according to one preferred embodiment of the present invention.
Figure 10:
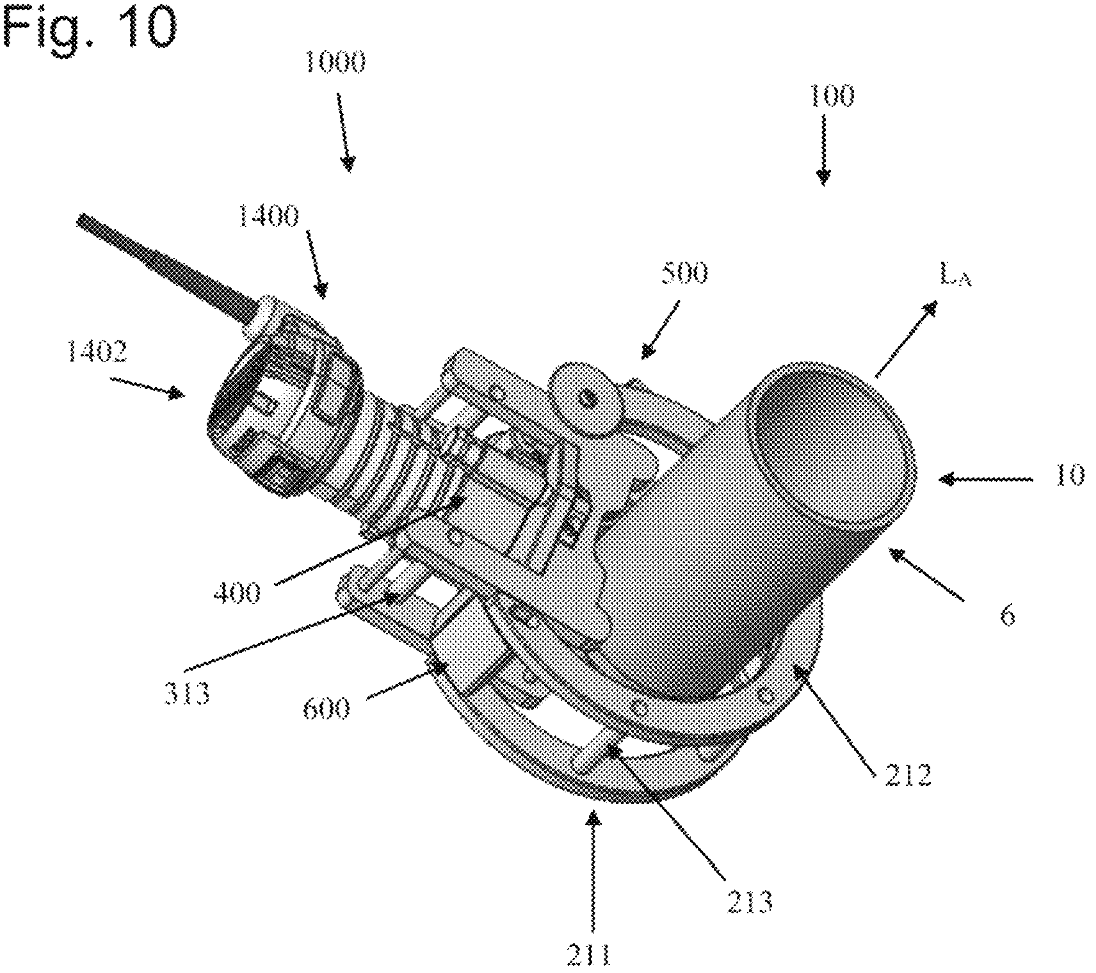
FIG. 10 is a further perspective view of the plastic pipe grooving tool shown in FIG. 8 having a pipe held in the pipe holding device according to one preferred embodiment of the present invention.
Figure 11:
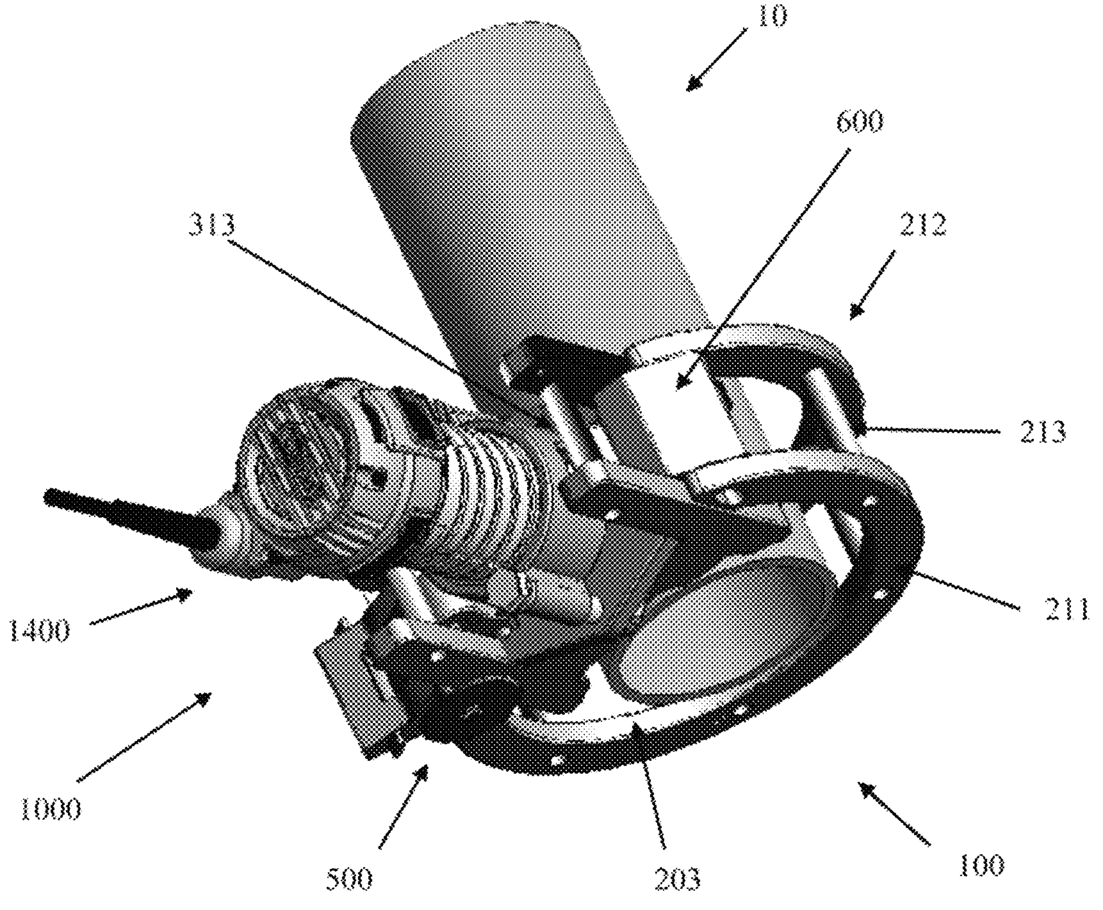
FIG. 11 is a further perspective view of the plastic pipe grooving tool shown in FIG. 8 having a pipe held in the pipe holding device according to one preferred embodiment of the present invention.
Figure 12:
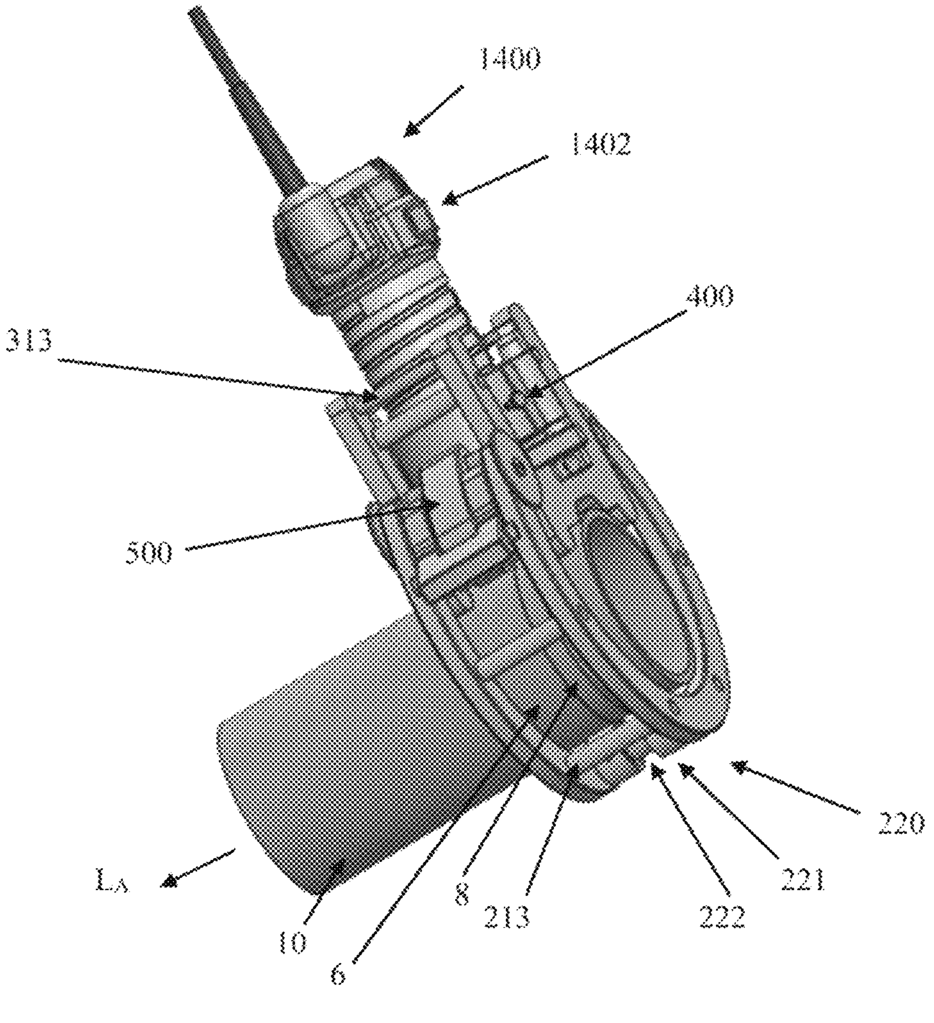
FIG. 12 is a further perspective view of the plastic pipe grooving tool shown in FIG. 8 having a pipe held in the pipe holding device and the clamp lever in the closed position, according to one preferred embodiment of the present invention.

The clamp 500, in one preferred embodiment has a pin or axle, shown generally by reference numeral 503 in FIG. 6] about which the clamp lever 504 may move to engage and disengage the clamp hook 502. Optionally, the clamp 500 may have washers 503, as shown for example in FIGS. 3, 5, 6 and 7, but these are not necessarily required. It is understood that other arrangements to operate of the clamp 500 to move the clamp hook 502 from the engaged and disengaged positions would be possible.

Accordingly, the clamp 500 cooperates with the retaining member 600 to releasably attach the curved frame 200 to the intermediate body 300 at predetermined positions corresponding to the distance of the pairs 313*a*, 313*b* and 313*c* of equidistant longitudinally extending body supports 313 from the body cradle surface 303 of the intermediate body 300 as shown in FIGS. 15A, 15B, and 15C. This distance of the pairs 313*a*, 313*b* and 313*c* of equidistant longitudinally extending body supports 313 from the body cradle surface 303 also corresponds to the discrete positions that the clamp 500 may releasably attach the intermediate body 300 to the curved frame 200 so that pipes 10 of discrete different diameters [as shown by reference numerals 10*a*, 10*b* and 10*c* in FIGS. 13A, 13B and 13C] in Figures longitudinally received within the arcual opening 210 may be held and rotated between the frame rollers 220 and the body rollers 320 as shown in FIGS. 13A, 13B and 13C.

Figure 14C:
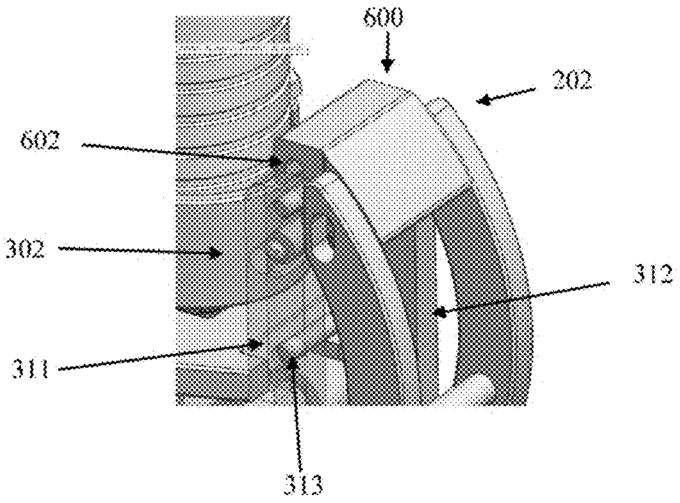
FIG. 14C shows an enlarged view of the pipe holding device shown in FIG. 14B from the second end of the curved frame showing the retaining member and the retaining member hook being disengaged from a longitudinally extending body support with the body side frame shown as transparent for better illustration.

Accordingly, as shown in FIGS. 13A, 13B, 13C, 15A, 15B and 15C, translational movement of the intermediate body 300 with respect to the curved body 200 permits the clamp hook 502 and retaining member hook 602 to engage successive pairs 313*a*, 313*b* and 313*c* of equidistant longitudinally extending body supports 313 of the intermediate body 300 to releasably clamp the curved frame 200 with respect to the intermediate body 300 at discrete predetermined positions such that the distance separating the frame rollers 320 from the body rollers 220 corresponds to discrete different diameters of pipe 10*a*, 10*b* and 10*c* longitudinally receivable within the arcual opening 210 as shown in FIGS. 13A, 13B and 13C. Furthermore, actuating the hook lever 504 of said clamp 500 in the direction of the arrow shown in FIG. 14A, releases the clamp hook 502 from the transversely extending body support 313 on the first side 301 of the intermediate body 300, as shown in FIG. 14B, and allows the retaining member hook 602 to be disengaged from the corresponding equidistant transversely extending body support 313 on the second side 302 of the intermediate body 300 [as shown in FIG. 14C], thereby permitting relative translational movement of the intermediate body 300 with respect to the curved frame 200.

As also shown in FIGS. 13A to 15C, the pipe grooving tool 1000 may also comprise a vacuum attachment, shown generally by reference numeral 1600. The vacuum attachment 1600 may be releasably attached to an external vacuum source [not shown] that may create a vacuum between the body rollers 320 and more specifically near the body cradle surface 303. The vacuum attachment 1600 thus may create a vacuum to expel portions of the pipe 10 that have been remove from the surface 6 of the pipe 8 while the actuating element 1400 is actuating the grooving element 1500 to make a groove 8 on the surface 6 of a plastic pipe 10 longitudinally received in the arcual opening 210.

The present invention also comprises a plastic pipe grooving tool kit, shown generally in FIGS. 15A, 15B and 15C by reference numeral 1100. The kit 1100 is similar to the plastic pipe grooving tool 1000 but sold as individual components in a kit format. The kit 1100 comprises the pipe holding device 100 as well as the actuating element 1400. The actuating element 1400 may have the grooving element 1500 associated therewith but would be generally sold and transported in an unattached configuration from the actuating element 1400. Furthermore, the actuating element 1400 would generally be unattached from the intermediate body 300 when the kit 1100 is sold or transported, but would be operable to be releasably attached to the actuator adaptor 400 of the intermediate body 300 during use for actuating the grooving element 1500 to make a groove 8 in a plastic pipe 10 longitudinally received in the arcual opening 210. Similarly, the clamp 500 may releasably clamp the intermediate body 300 to the curved frame 200 at discrete positions so that pipes 10 of discrete different diameters longitudinally received within the arcual opening 210 may be held and rotated between the frame rollers 220 and the body rollers 330 while the grooving element 1500 engages a surface 8 of the longitudinally extending pipe 10 to make a groove 8 thereon while the pipe 10 is being manually rotated relative to the grooving element 1500. In other words, the plastic pipe grooving tool kit 1100 may be sold to purchasers and users who may then use the kit 1100 to make or assemble the plastic pipe grooving tool 1000 discussed above.

While a preferred embodiment has been illustrated and described where the pipe holder device 100 is used as part of the pipe grooving tool 1000, it is understood that the pipe holder device 100 is not limited to this specific use. Rather, the pipe holder device 100 may be utilized in any application where pipes 10 of different discrete diameters are required to be held and axially rotated.

Furthermore, while preferred embodiments have been described with pipes 10 having discrete diameters 2 inches 10*a*, 4 inches 10*b*, and 6 inches 10*c*, common for instance in plumbing applications, it is understood that the pipe holding device 100 could be used in other applications and with other discrete diameters of pipe 10. For instance, and by way of non-limiting example, the pipe holding device 100 could be used in ventilation applications where pipes are used for ventilating air or other gases, or with electrical non-metallic tubing [ENT], or in other types of applications where pipes 10 with different discrete diameters may need to be held and rotated. In addition, while the pipe holding device 100 has been described in the context of being utilized in a pipe grooving tool 1000 to make grooves 8 on the surfaces 6 of pipes 10, it is understood that the pipe holding device 100 may be used on its own or in other tools [not shown] or embodiments. In these cases, the actuating adaptor 400 could be used to attach an actuating element 1400 that is something other than an electric router 1402.

It is also understood that reference to pipes and plastic pipes herein is intended to refer to tubes of generally cylindrical shape used to convey water, gas, oil, or other fluid substances from one location to another and whether or not under pressure. It is further understood that reference to plastic pipes is intended to refer to pipes made of any plastic material, including but not limited to polyvinyl chloride (PVC), chlorinated polyvinyl chloride (CPVC), polyethylene (PE), and (ABS).

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification.

Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A pipe holding device for holding longitudinally extending pipes of discrete different diameters, said pipe holding device comprising:

a. a curved frame extending from a first end to a second end and defining a substantially arcual opening for longitudinally receiving a longitudinally extending pipe therethrough, said curved frame having a frame cradle surface facing the arcual opening and having at least one frame roller extending longitudinally for rotatably engaging a surface of a pipe longitudinally received through the arcual opening;

b. an intermediate body having a body cradle surface facing the frame cradle surface, said intermediate body located between the first end and the second end of the curved frame and substantially translationally moveable with respect to the curved frame to move the body cradle surface with respect to the frame cradle surface, said intermediate body having at least one body roller extending substantially parallel to the frame roller for rotatably engaging the surface of the pipe longitudinally received within the arcual opening, said intermediate body further having an actuating adaptor for attaching to the intermediate body an actuating element; and c. a clamp for releasably attaching the intermediate body to the curved frame at predetermined translational positions thereto to accommodate, within the arcual opening, longitudinally extending pipes having discrete diameters;

wherein the clamp may releasably clamp the intermediate body to the curved frame at discrete positions so that pipes of discrete different diameters longitudinally received within the arcual opening may be held and rotated between the at least one frame roller and the at least one body roller;

wherein the at least one frame roller partially extends radially into the arcual opening from the curved cradle surface and the at least one body roller extends partially radially into the arcual opening from the body cradle surface;

wherein the intermediate body comprises a first body side frame connected to a substantially similar second body side frame by longitudinally extending body supports longitudinally separating the first body side frame from the second body side frame, said first body side frame having a first body side cradle surface, and, said second body side frame having a second body side cradle surface, the first and second body side cradle surface facing the arcual opening and forming the body cradle surface facing the frame cradle surface; and wherein the clamp engages at least one of the longitudinally extending body supports to releasably attach the intermediate body to the curved frame at discrete positions thereto to accommodate longitudinally extending pipes having discrete diameters within the arcual opening and between the at least one frame roller and the at least one body roller.

2. The pipe holding device as defined in claim 1 wherein the intermediate body has a first side and a second side transversely opposite from the first side, and wherein the first end of the curved frame is received on the first side of the intermediate body between the first body side frame and the second body side frame, and, the second end of the curved frame is received on the second side of the intermediate body between the first body side frame and the second body side frame to facilitate the substantially translational relative movement of the intermediate body with respect to the curved frame; and wherein the at least one body rollers are located between the first body side frame and the second body side frame on roller supports extending substantially parallel to the longitudinally extending body supports.

3. The pipe holding device as defined in claim 2 wherein the actuating adaptor is located between the first body frame and the second body frame, and, the actuating adaptor is located substantially axially intermediate the first end and the second end of the intermediate body.

4. The holding device as defined in claim 3 wherein the curved frame comprises a first curved side frame and a second curved side frame, and wherein the first curved side frame is connected to the second curved side frame by longitudinally extending frame supports separating the first curved side frame from the second curved side frame, said first curved side frame having a first curved side frame cradle surface, and, said second curved side frame having a second curved side frame cradle surface, said first and second curved side frame cradle surfaces facing the arcual opening and forming the frame cradle surface facing the body cradle surface;

wherein the at least one frame roller is located between the first curved side frame and the second curved side frame on roller supports substantially parallel to the longitudinally extending frame supports.

5. The holding device as defined in claim 4 wherein the clamp is located between the first curved side frame and the second curved side frame at the first end of curved frame, and a retaining member is located between the first curved side frame and the second curved side frame at the second end of the curved frame, said clamp having a clamp hook and said retaining member having a retaining member hook;

wherein said longitudinally extending body supports are oriented along the first side and the second side of the intermediate body in pairs substantially equidistant from the body cradle surface of the intermediate body, with one of each pair of equidistant longitudinally extending body supports being arranged on the first side of the intermediate body and a corresponding other one of the pair of equidistant longitudinally extending body supports being arranged on the second side of the intermediate body; and wherein the clamp has a lever to move the clamp hook from an engaged position, where the clamp hook engages one of the longitudinally extending body supports on the first side of the intermediate body when the retaining member hook engages the corresponding equidistant longitudinally extending body support on the second side of the intermediate body, to a disengaged position, where the transversely extending body support on the first side of the intermediate body is released from the clamp hook permitting the retaining member hook to be disengaged from the corresponding equidistant transversely extending body support on the second side of the intermediate body to permit relative translational movement of the intermediate body with respect to the curved frame.

6. The pipe holding device as defined in claim 5 wherein translational movement of the intermediate body with respect to the curved body permits the clamp hook and retaining member hook to engage successive pairs of equidistant longitudinally extending body supports of the intermediate body to releasably clamp the curved frame with respect to the intermediate body at discrete predetermined positions such that the distance separating the at least one frame roller from the at least one body roller corresponds to discrete different diameters of pipe longitudinally receivable within the arcual opening; and wherein actuating the lever of said clamp releases the clamp hook from the transversely extending body support to permit relative translational movement of the intermediate body with respect to the curved frame.

7. The holding device as defined in claim 5 wherein the at least one body roller comprises two longitudinally separated body rollers on each of the body roller supports situated between the first body side frame and the second body side frame and substantially parallel to the longitudinally extending frame supports, and the at least one frame roller comprises two longitudinally separated frame rollers on a frame roller support between the first curved side frame and the second curved side frame; and wherein the actuator adaptor is located between the two body rollers and diametrically opposed from the frame roller support.

8. The holding device as defined in claim 4 wherein the frame roller support has two longitudinally separated frame rollers and each of the body roller supports has two longitudinally separated body rollers.

9. A plastic pipe grooving tool comprising:

a pipe holding device as defined in claim 7; and an actuating element attached to the actuator adaptor for actuating a grooving element to make a groove in a plastic pipe longitudinally held by the frame rollers and the body rollers and axially rotated in the arcual opening; and wherein the clamp releasably clamps the intermediate body to the curved frame at discrete positions so that pipes of discrete different diameters longitudinally received within the arcual opening may be held and rotated between the frame roller and the at least one body roller with the grooving element engaging a surface of the longitudinally extending pipe to make a groove therein while the pipe is being rotated relative to the grooving element.

10. The plastic pipe grooving tool as defined in claim 9 wherein the actuating element comprises a powered router for operating the grooving element to make the groove in the plastic pipe, and wherein the powered router is located longitudinally axially intermediate the first side of the intermediate body and the second side of the intermediate body when the powered router is attached to the actuator adaptor.

11. The plastic pipe grooving tool as defined in claim 10 wherein actuating the lever of the clamp provides a quick release of the clamp from the longitudinal extending body supports of the intermediate body permitting translational movement of the intermediate body with respect to the curved body to separate the frame roller from the at least one body roller to release the plastic pipe.

12. The plastie pipe grooving tool as defined in claim 10 wherein the at least one frame roller and the at least one body roller are made from a resiliently deformable material to permit the at least one frame roller and at least one body roller to frictionally hold the pipe between the frame cradle surface and the body cradle surface and wherein the body rollers rotate about the body roller supports and the frame rollers rotate about the frame roller support to facilitate manual rotation of the pipe by hand while the pipe is frictionally held by the at least one frame roller and at least one body roller between the frame cradle surface and the body cradle surface and the grooving element is actuated to make the groove.

13. A kit for a plastic pipe grooving tool comprising:

a pipe holding device as defined in claim 7; and an actuating element, having a grooving element associated therewith, which is releasably attachable to the actuator adaptor of the intermediate body, said actuating element, when attached to the actuator adaptor, can actuate the grooving element to make a groove in a plastic pipe longitudinally received in the arcual opening; and wherein the clamp releasably clamps the intermediate body to the curved frame at discrete positions so that pipes of discrete different diameters longitudinally received within the arcual opening may be held and rotated between the frame roller and the at least one body roller while the grooving element engages a surface of the longitudinally extending pipe to make a groove thereon while the pipe is being rotated relative to the grooving element.

14. The kit for a plastic pipe grooving tool as defined in claim 13 wherein the at least one frame roller is made from a resiliently deformable material to permit the at least one frame roller to frictionally hold the pipe between the frame cradle surface and the body cradle surface while the pipe is being rotated to make the groove.

15. The kit for a plastic pipe grooving tool as defined in claim 14 wherein the at least one body roller is made from the resiliently deformable material as the at least one frame roller to permit the at least one body roller and the at least one frame roller to frictionally hold the pipe between the frame cradle surface and the body cradle surface while the pipe is being rotated to make the groove.

* * * * *